May 31, 1938.    H. F. SMITH    2,119,494
REFRIGERATING APPARATUS
Filed Sept. 30, 1936    3 Sheets-Sheet 1

INVENTOR.
Harry F. Smith
BY
Spencer Hardman and Fehr
ATTORNEYS

May 31, 1938. H. F. SMITH 2,119,494
REFRIGERATING APPARATUS
Filed Sept. 30, 1936 3 Sheets-Sheet 2

INVENTOR.
Harry F. Smith
BY Spencer Hardman and Fehr
ATTORNEYS

May 31, 1938. H. F. SMITH 2,119,494
REFRIGERATING APPARATUS
Filed Sept. 30, 1936 3 Sheets-Sheet 3

INVENTOR.
Harry F Smith
BY
Spencer Hardman and Fehr
ATTORNEYS

Patented May 31, 1938

2,119,494

UNITED STATES PATENT OFFICE 2,119,494

REFRIGERATING APPARATUS

Harry F. Smith, Dayton, Ohio, assignor to General Motors Corporation, Dayton, Ohio, a corporation of Delaware Application September 30, 1936, Serial No. 103,298

16 Claims. (Cl. 62—118)

This invention relates to refrigerating apparatus and more particularly to means for cooling absorption refrigerating apparatus.

Absorption refrigerating apparatus is built in a number of different types. It is built in the continuous type in which there is a separate generator, condenser, an evaporator and an absorber. It is also built in the intermittent type wherein there is a combined generator-absorber, an evaporator and a condenser. In the intermittent type, the generator-absorber is alternately heated and cooled, while in the continuous type, the generator is continuously heated, while the absorber is continuously cooled. For the most part, absorption systems have been cooled by water, but in recent years, some systems have been cooled by air.

Ordinarily, when cooled by air, this has been in the form of natural draft circulation. However, because of the low specific heat of air, rather large amounts of air must be circulated and a large surface must be provided so that in cooling by natural draft, the apparatus becomes rather bulky and heavy. The use of a forced draft clearly reduces the size, weight and cost of the condenser and sometimes the absorber. It is considered undesirable to use an electric motor for circulating cooling air over the condenser because this requires an additional source of power, whereas absorption refrigerating systems are ordinarily operated upon gas or kerosene.

It is an object of my invention to provide an absorption refrigerating system with a cooling means energized by heat derived from the system.

It is a more specific object of my invention to provide fan means driven by a heat engine which is energized by heat from the heating means of the apparatus for circulating cooling air over the condenser and absorbing means of the absorption refrigerating apparatus.

Further objects and advantages of the present invention will be apparent from the following description, reference being had to the accompanying drawings, wherein a preferred form of the present invention is clearly shown.

Figure 1:
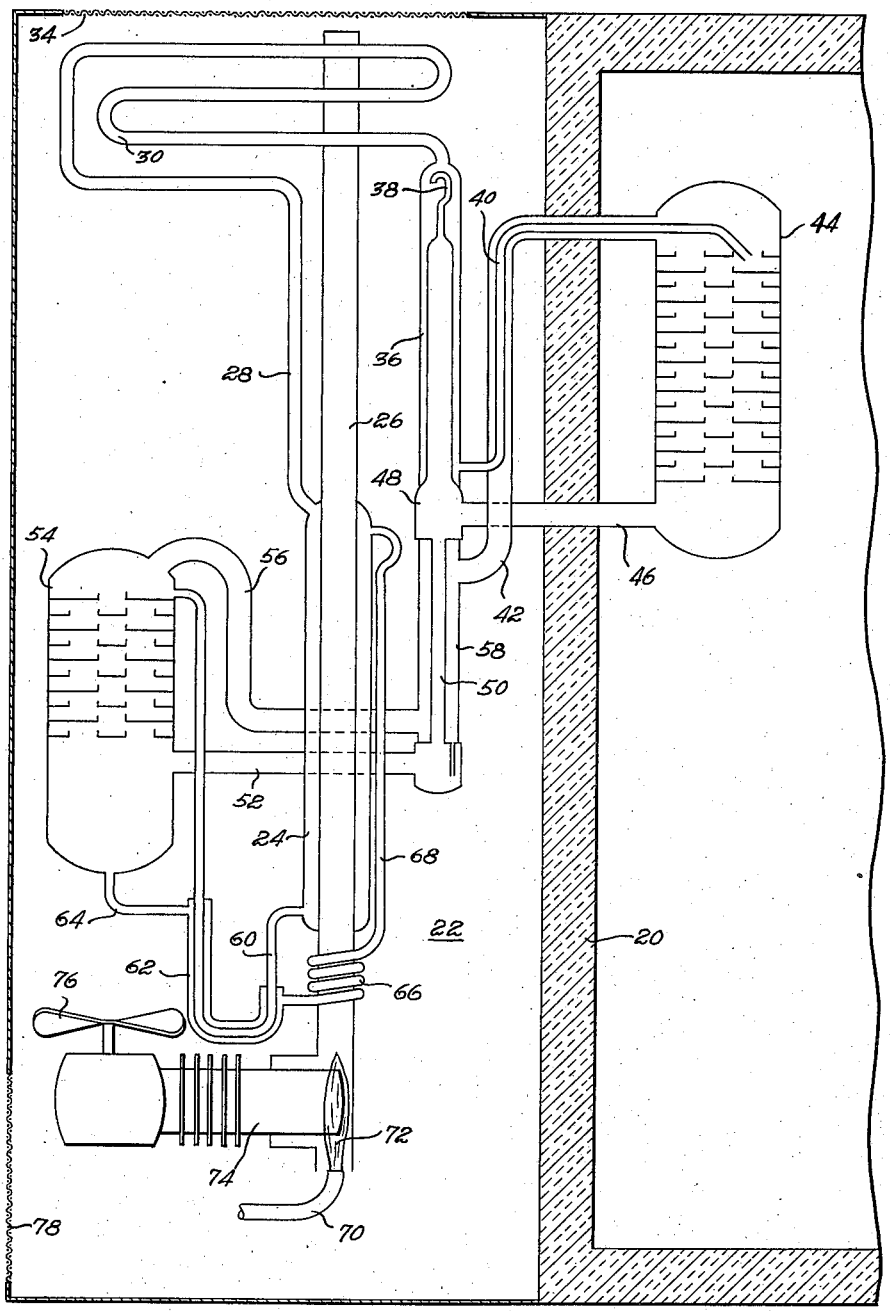
Fig. 1 is a diagrammatic illustration of a continuous type of absorption refrigerating system embodying one form of my invention.

Briefly, in the modification shown in Fig. 1, I have shown diagrammatically an absorption refrigerating system of the continuous partial pressure type, sometimes known as the Platen-Munters type of absorption refrigerating system. This absorption refrigerating system is provided with a continuous heater for the generator. Connected to this heater, I provide a heat engine of the Stirling type which drives a fan for circulating cooling air over the absorber and the condenser of this absorption refrigerating system.

Figure 2:
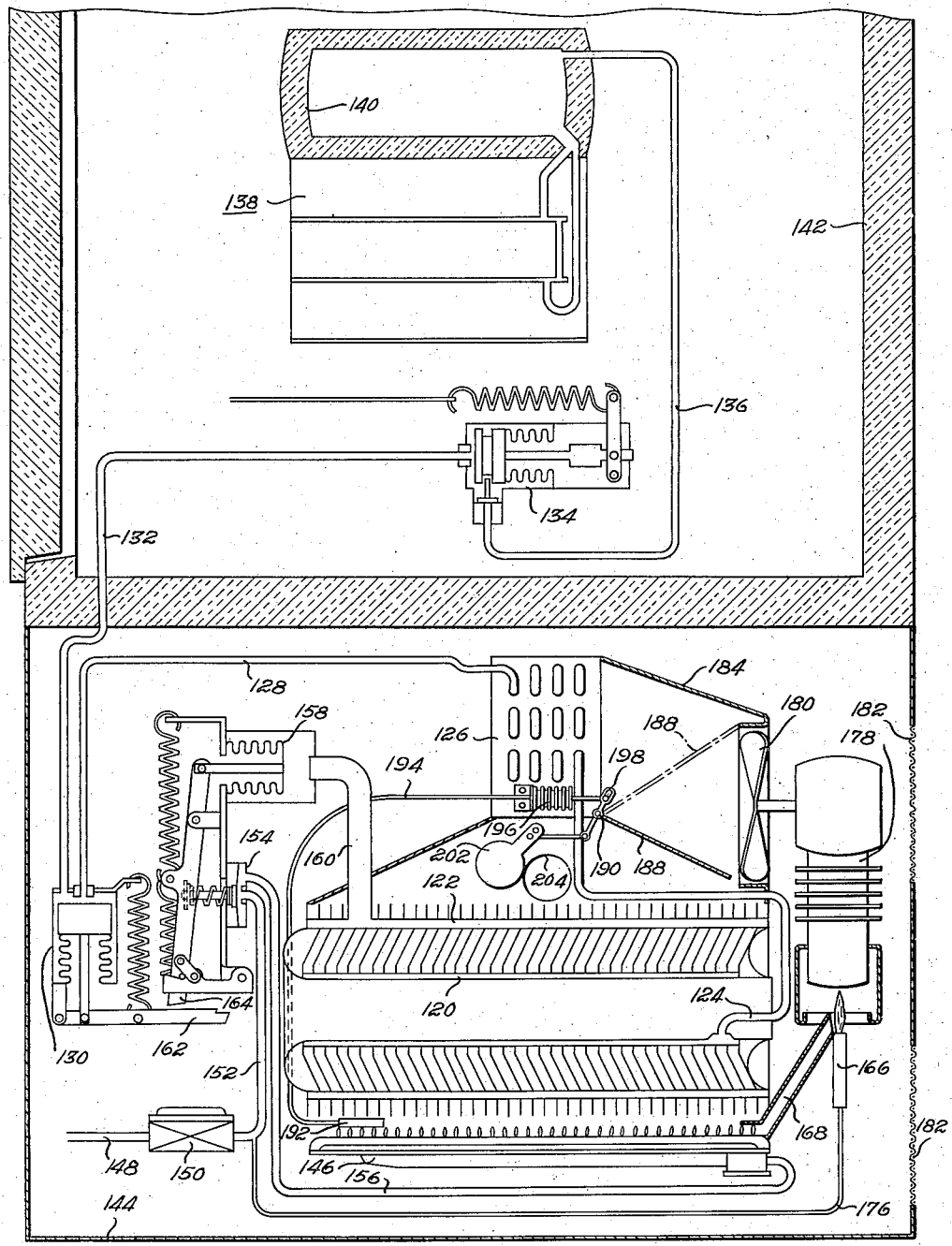
Fig. 2 is a diagrammatic illustration of a simple form of intermittent absorption refrigerating system embodying a modified form of my invention.

In the modification shown in Fig. 2, I have shown diagrammatically an intermittent absorption refrigerating system including a generator-absorber, an air cooled condenser and an evaporator. In this system, there is provided a pilot light and a main burner which is lighted from the pilot light through a flash tube. The main burner operates intermittently, but the pilot light operates continuously. This pilot light, I also use to operate a Stirling type of heat engine which drives a fan for circulating air over the condenser of this intermittent absorption refrigerating system during the generating cycle and over the generator-absorber during the absorption cycle.

Figure 3:
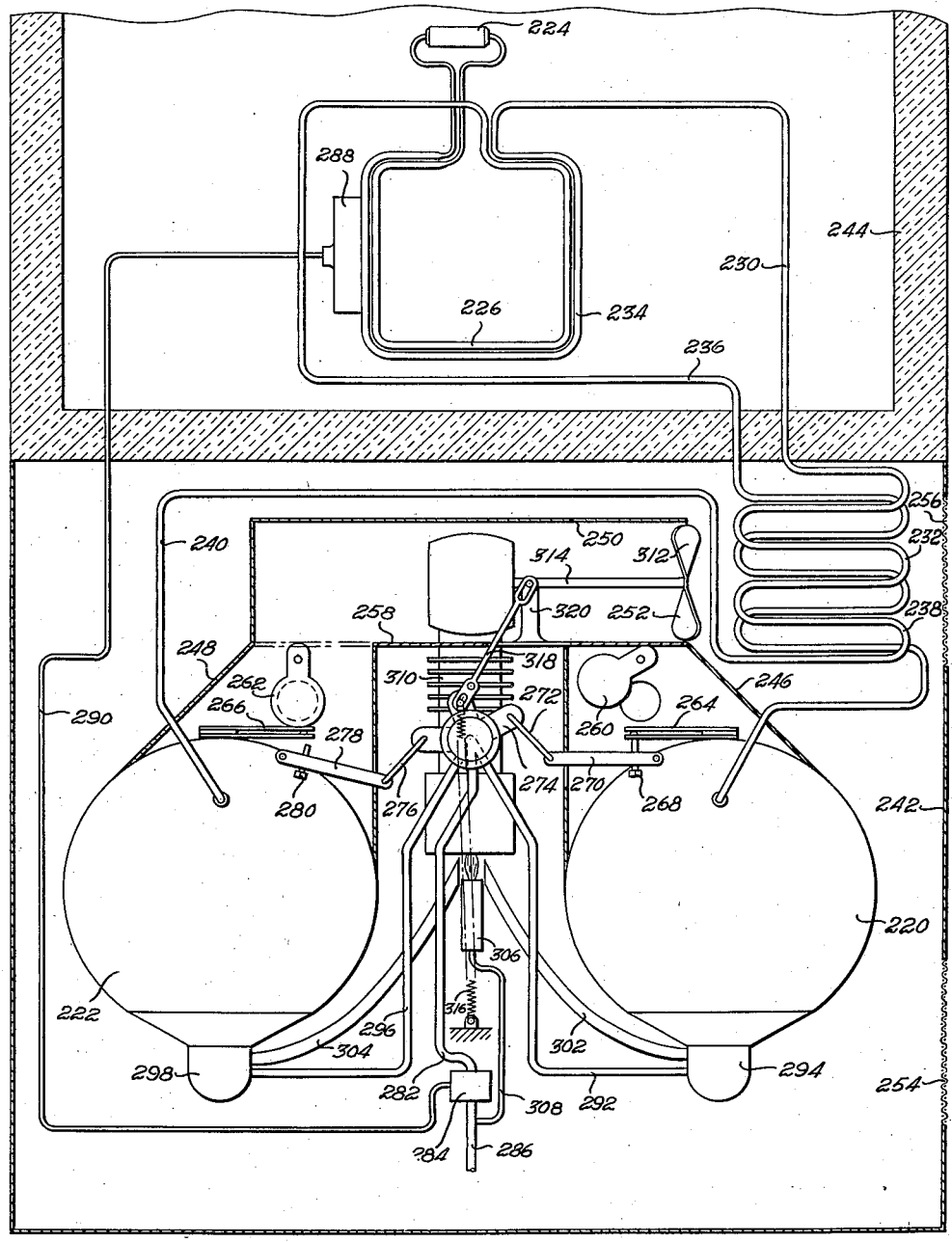
Fig. 3 is a diagrammatic illustration of a multiple absorption refrigerating system embodying another form of my invention.

In the modification shown in Fig. 3, I have shown diagrammatically a twin generator-absorber, condenser, evaporator absorption system. In this system, the one generator-absorber is heated while the other cools. Each of the burners is provided with a flash tube extending to a common pilot light which also operates a heat engine of the Stirling type which drives a fan for circulating cooling air over the generator-absorber to be cooled and the condenser.

Referring now to the drawings, and more particularly to Fig. 1, there is shown an insulated refrigerator cabinet 20, provided with an apparatus compartment 22 at its side. The absorption refrigerating system comprises a generator 24 having a heating flue 26 extending through its central portion extending from beneath the bottom of the generator to the top of the compartment 22. The upper part of the generator is connected by a conduit 28 to the condenser 30 shown in the upper part of the compartment 22 adjacent the outlet 34. The bottom of the condenser 30 is connected to a liquid ammonia receiver 36 which is provided in its upper portion with a bent over hydrogen vent 38. This receiver 36 is connected by a tube 40 which extends through a larger tube 42 to the evaporating means 44 which is located within the insulated compartment 20. The tubes 40 and 42 serve as a heat exchanger.

The evaporating means 44 is provided with a series of superimposed stacked pans capable of holding a thin sheet of liquid refrigerant. The bottom of the evaporator is connected by a gas tube 46 to an enlarged connecting portion 48 which connects upwardly to the vent 38 and which has a tube 50 extending downwardly which connects to a horizontal tube 52 extending to the bottom portion of the absorber 54. The absorber 54 contains a series of superimposed stacked pans capable of holding thin sheets of weak liquor and is connected at its upper portion by a hydrogen tube 56 which connects with a tube 58 surrounding the smaller tube 50 and serving as a heat exchanger. This tube 58 has the hydrogen tube 42 connected to it for conducting hydrogen to the top of the evaporator.

The lower part of the generator is connected by a weak liquor tube 60 which passes through a heat interchanger 62 and thence extends upwardly to the top of the absorber. The bottom of the absorber is connected by a strong liquor tube 64 which passes through and forms the outside of the heat interchanger 62 and connects to a vapor lift pump 66 formed of an ascending spiral tube wrapped around the portion of the flue 26 immediately beneath the generator 24. The upper portion of this spiral tube or pump is connected by a conduit or tube 68 to the top of the generator.

According to my invention, I provide a heating means in the form of a gas burner 70 from which issues a gas flame 72 located within the lower portion of the flue 26. This flue is provided with a sort of a boss or recess into which extends the head end of a Stirling type heat engine. This heat engine is preferably provided with a displacer, a piston, a connecting rod and a crank shaft and with cylinder portions to be heated and cooled. The engine may be charged with air either at atmospheric pressure or preferably at some elevated pressure or it may be charged with some other gaseous fluid at atmospheric or a higher pressure. Preferably, the engine is charged with a gas at a higher pressure, since this increases the efficiency of the engine.

The engine is continuously heated at its head end by the flame 72 and is provided with a fan 76 upon its crank shaft which draws air into the inlet opening 78 in the chamber 22 and circulates air through the chamber particularly over the absorber 54 and over the surfaces of the condenser 30, thence out the top outlet opening 34. In operation, the heat from the burner 72 heats the rich ammonia liquor in the generator 24 and drives gaseous ammonia therefrom. This gaseous ammonia rises up the tube 28 where any water vapor in the gas condenses out and the substantially pure ammonia gas ascends to the condenser where it is cooled by the flow of air and condensed to liquid form. This condensed ammonia falls into the receiver 36. When sufficient liquid ammonia has been collected in the receiver 36, this ammonia passes through the inner liquid ammonia tube 40 to the upper portion of the evaporator 44 where it is discharged into the upper stacked pans from which it spills over in the form of cascades into the lower stacked pans.

An atmosphere of hydrogen is present in the evaporator and the absorber, as well as the connecting hydrogen and gas passages therebetween. In this hydrogen atmosphere, the ammonia evaporates according to its own partial pressure aided by the circulation of hydrogen. This circulation of hydrogen is effected by reason of the evaporation of ammonia within the evaporator which mixes in vapor form with the hydrogen, thus making the atmosphere within the evaporator heavier and causing it to fall through the passages in the stacked pans to the bottom of the evaporator and thence through the connecting gas tubes 46, 48, 50 and 52 to the bottom of the absorber 54.

From the bottom of the generator 24, weak liquor is conducted through the pipe 60 to the heat interchanger 62 where it is cooled and conducted to the top of the absorber where this weak liquor is discharged into the upper-most of the stacked pans, from which it falls in the form of a cascade into the lower stacked pans. The absorber 54 is cooled by the flow of air from the heat engine driven fan 76 and as a result, absorbs the ammonia vapor from the ammonia laden hydrogen atmosphere which has been brought into the absorber from the bottom of the evaporator. Only the hydrogen remains and this hydrogen passes upwardly through the stacked pans to the top of the absorber and thence because of its relatively light weight, passes through the hydrogen passages 56, 58 and 42 to the top of the evaporator. In so doing, this hydrogen gas is cooled by the interchange between the tube 50 which carries the ammonia laden atmosphere. This hydrogen also effects a heat interchange with the liquid ammonia carrying tube 40. Should any hydrogen collect in the receiver 36, this is removed through the vent 38.

In Fig. 2, there is shown a generator-absorber 120 formed of stacked pans between which is lodged a solid absorbent material. On the outer portion of the stacked pans, there is provided the volatile liquid heating jacket 122. The solid absorbent spaces are connected by a refrigerant tube 124 to an air cooled condenser 126. This air cooled condenser 126 is connected by a conduit 128 to an interlock control mechanism 130 which in turn is connected by a tube 132 to a two-way control valve 134. This two-way control valve 134 controls the flow of condensed refrigerant from the condenser to the evaporator during the generating period and during that time maintains a sufficiently high pressure within the condenser to condense the ammonia therein and during the absorbing period maintains a predetermined evaporating pressure and temperature within the evaporator so as to prevent the evaporator from becoming too cold. This two-way regulating valve 134 is connected by a conduit 136 to an evaporator 138. This evaporator is provided with an insulated receiving chamber 140 which has its bottom portion connected to the refrigerating surfaces of the evaporator. The evaporator 138 is located within an insulated food compartment 142 of a domestic refrigerator. The remaining portions of the refrigerating system are located within the so-called machine compartment 144 beneath the food compartment.

The generator-absorber is heated by a gas burner 146. This gas burner is supplied with gas through a gas line 148 which connects to a pressure regulating valve 150 which controls the pressure of the supply of gas through the tube 152 to a gas control valve 154. The control valve 154 controls the supply of gas through the conduit 156 to the gas burner. This gas control valve 154 is operated by a pressure responsive bellows 158 which is connected by a tube 160 to the heating jacket 122 of the generator absorber which contains the volatile heating fluid. The increase in pressure of the volatile heating liquid at the end of the generating period when substantially all of the refrigerant has been driven from the generator-absorber causes a partial collapse of the bellows 158 to close the gas control valve 154. This shuts off the gas to the burner 146 and allows the cooling of the volatile heating liquid.

This cooling relieves the pressure on the bellows 158, but the opening of the gas valve 154 is prevented by the interlock mechanism 130 which has a lever 162 which engages the lower end of the gas valve lever 164 to prevent the gas valve from opening until released by the interlock mechanism 130. This interlock mechanism 130 will not release the lever 164 until the refrigerant pressure within the conduit 132 and 128 rises above a predetermined pressure which indicates that the capacity of the generator-absorber is being exceeded and that a new generating cycle should begin. A pilot light 166 and a flash tube 168 are provided for lighting the gas burner 146 when the valve 154 is opened. This pilot light 166 burns continuously and is supplied with gas through a small conduit 170 which is connected to the gas supply conduit 152.

If mere natural draft were relied upon to cool the air cooled condenser 126, the condenser 126 would have to be made an enormous size. In order to avoid this, I have provided a heat engine 178 of the Stirling type which has its head heated by the pilot flame from the pilot 166. This Stirling type heat engine drives a fan 180 which draws air through the passages in the condenser and thence through a large duct 184 during the generating period and draws air from around the generator-absorber during the absorption period. The machine compartment 144 is provided with openings 182 for admitting and discharging the circulating air.

In order to enable the fan 180 to draw the air to the surfaces of the condenser during the generating cycle and to draw the air over the surfaces of the generator-absorber during the absorption cycle, I provide a damper 188 pivoted at 190 which assumes the positions shown during the generating cycle and which assumes an upper dotted line position indicated by the reference character 188' during the absorption cycle. Thus, when the damper is in its lowermost position, the fan 180 will draw the air through the condenser 126. When the damper is in its upper position indicated by the reference character 188', the fan 180 will draw the air over the finned outer surface of the generator to cool the generator.

In order to do this, there is provided a thermostatic bulb 192 between the burner 146 and the bottom of the generator 120 so that this thermostat is directly heated by the burner during the generating cycle. This thermostat bulb 192 is connected by a tube 194 which connects to a bellows 196 mounted upon the side of the condenser 126. The movable end of this bellows 196 is connected to a lever 198 which is fastened to and rotatable with the damper 188. This lever 198 is connected by an operating rod to another damper 202 which is moved by the lever 198 to uncover an opening 204 in the shroud of the generator during the heating or generating cycle.

Thus, when the burner is lighted, the thermostat is heated, causing its volatile fluid to expand the bellows 196 and move the lever 198, the damper 188 and the damper 202 to the position shown in Fig. 2. When the generating cycle is terminated by the closing of the gas valve 164, the burner 146 is extinguished, the thermostat bulb 192 cools and causes the partial collapse of the bellows 196. This partial collapse of the bellows 196 turns the lever 198, the damper 188 and the damper 202, all in a counter-clockwise direction so that the damper reaches the position 188' and the damper 202 reaches the position covering the outlet 204 so that air is drawn by the fan 180 up over the surfaces of the generator to cool the generator-absorber and cause absorption of refrigerant therein. By using a heat engine, I am able to provide adequate air cooling with relatively small exposed surfaces.

In Fig. 3, I have shown a detailed generator-absorber refrigerating system. In this system, there is provided a generator-absorber 220 and a second generator-absorber 222 which are connected at opposite ends of a connecting refrigerant conduit. These generator-absorbers may be either of the liquid or solid type, preferably of the solid absorption type. In this system there is provided a restrictor 224 which divides the refrigerant conduit into two parts. On either side of the restrictor, the conduit is provided with an evaporator and between the evaporator and each of the generators is a condenser. Thus, connected on one side of the restrictor is the evaporator 226, the connecting conduit 230 and the condenser 232 which is connected to the generator-absorber 220. On the other side of the restrictor 224 is a refrigerant evaporator 234, a connecting conduit 236 and a condenser 238 connected by a connecting conduit 240 to the generator-absorber 222.

One of these generator-absorbers is heated, while the other is cooled so that condensation takes place in the condenser nearest the generator-absorber being heated, while evaporation of refrigerant and refrigeration is provided in the evaporating means nearest the generator-absorber being cooled. When substantially all of the refrigerant is driven out of the one generator-absorber, the temperature rises, actuating a thermostat to reverse the process and cause the other generator-absorber to be heated and the one which was heated to be cooled.

The generator-absorbers and condensers are located in a machine compartment 242 beneath the insulated food or storage compartment 244 of a domestic refrigerator. In order to control the circulation of air, I have provided a shroud 246 for the generator 220 and shroud 248 for the generator 222. These shrouds communicate with a fan duct 250 which is provided with a fan 252 located in its outlet for drawing air through the duct and discharging the air over the surfaces of each of the condensers 232 and 238. An inlet 254 and an outlet 256 are provided in the machine compartment for this purpose.

A slidable damper 258 is provided for controlling the communication between the shrouds and the fan duct 250. When the slidable duct 258 is moved to the right in a position shown in Fig. 3, the shroud of the generator 246 is cut off from the duct 250, while air may freely be drawn from the shroud 248 into the duct 250. Under such conditions, the generator-absorber 220 is being heated while the generator-absorber 222 is being cooled. When the damper 258 is moved toward the left, flow of air from the shroud 248 to the duct 250 is cut off and flow is permitted from the shroud 246 to the duct 250. At the same time, this sliding damper 258 also operates the dampers 260 and 262 which open outlets in the shroud 246 and 248 respectively when the shroud is closed by a portion of the sliding damper 258.

The control of these dampers is provided by thermostats 264 and 266 which are mounted respectively in heat exchange relation with the generator-absorber 220 and 222. These thermostats may be of any suitable type and should be relatively powerful. The thermostat 264 operates through a set screw 268 upon a lever 270 which is connected by a link 272 to a rotary gas valve 274. This rotary gas valve is connected on the opposite side by a link 276 to a lever 278 provided with a set screw 280 which is adapted to be engaged by the thermostat 266 at the termination of the heating of the generator-absorber 222.

The rotary gas valve 274 is supplied with gas through a conduit 282 which is provided with a throttling gas valve 284 which throttles the flow of gas from the supply gas line 286 to the apparatus. This throttling gas valve 284 is controlled by a thermostat 288 mounted upon the evaporating means and connected by a connecting tube 290 to the valve 284 in order to control the supply of gas to the burners according to the amount of refrigeration that is required. The rotary gas valve 274 when in the position shown in Fig. 3 is adapted to conduct gas from the conduit 282 to the conduit 292 which supplies the gas to the burner 294 for the purpose of heating the generator-absorber 220. The valve 274 is also adapted to conduct gas from the conduit 282 to the conduit 296 which conducts the gas to the burner 298 for heating the generator-absorber 222.

In order to light the burners 294 and 298, when the gas is supplied to these burners, the burner 294 is provided with a flash tube 302, while the burner 298 is provided with a flash tube 304, each of which extends to a common pilot light 306 which is supplied with gas through the pilot conduit 308 which connects to the supply gas line 286. The pilot light also serves to heat the head end of a Stirling type heat engine 310 which drives the fan 312 through a drive shaft 314. This heat engine is located out of the path of the sliding damper 258 so that it will not interfere with the control of the air flow by this damper 258.

The gas valve 276 is provided with a toggle spring 316 which causes the gas valve to assume either one of two positions connected with either the gas conduit 292 or the gas conduit 296. The gas valve 274 also operates a lever 318 which is connected to an arm or a post 320 which extends upwardly from the slidable damper 258 so that the damper is moved in a direction opposite to the movement of the gas valve 274. Thus, when the gas valve 274 supplies gas to the burner 294, the damper 258 is in a position to close off the flow of air from the generator-absorber 220; while when the gas valve 274 is in a position to supply gas to the burner 298, the damper 258 will be moved to close off the flow of air from the generator to the fan duct.

By employing the pilot light to operate the heat engine to guide the fan, a very little fuel is required to operate the fan to cool the generator and condenser. By the use of the fan, the amount of condensing generator surface may be materially reduced and by the use of the heat engine, the cost of operation of the fan is reduced and no other source of power is required. The heat engine is preferably of the Stirling type and may operate upon the air, either atmospheric pressure or higher than atmospheric pressure, or it may operate upon other gases. However, other types of hot air and other types of heat engines may be used if desired.

While the form of embodiment of the present invention as herein disclosed constitutes a preferred form, it is to be understood that other forms might be adopted, all coming within the scope of the claims which follow.

What is claimed is as follows:

1. An absorption refrigerating system comprising generating, absorbing, condensing and evaporating means, heating means including means for heating the generating means, a fan for circulating a cooling medium into heat exchange relation with said condensing means, and a heat engine energized by heat derived from said heating means for driving said fan.

2. An absorption refrigerating system comprising generating, absorbing, condensing and evaporating means, heating means including means for heating the generating means, means for circulating a cooling medium into heat exchange relation with said condensing means, and a heat engine energized by heat derived from said heating means for operating said circulating means.

3. An absorption refrigerating system comprising generating, absorbing, condensing and evaporating means, heating means including means for heating the generating means, means for circulating a cooling medium into heat exchange relation with said condensing means, and a Stirling type heat engine energized by heat derived from said heating means for operating said circulating means.

4. An absorption refrigerating system comprising generator-absorber means, condensing means and evaporating means, means for heating the generator-absorber means, a pilot light for said heating means, a fan for circulating a cooling medium into heat exchange relation with said condensing means, and a heat engine energized by said pilot light for operating said fan.

5. An absorption refrigerating system comprising generator-absorber means, condensing means and evaporating means, heating means including means for heating the generator-absorber means, a fan for circulating a cooling medium into heat exchange relation with said condensing means, and a heat engine energized by said heating means for driving said fan.

6. An absorption refrigerating system comprising generator-absorber means, condensing means and evaporating means, heating means including means for heating the generator-absorber means, means for circulating a cooling medium into heat exchange relation with said condensing means, and a heat engine energized by said heating means for driving said circulating means.

7. An absorption refrigerating system comprising generator-absorber means, condensing means and evaporating means, heating means including means for heating the generator-absorber means, means for circulating a cooling medium into heat exchange relation with said condensing means, and a Stirling type heat engine energized by said heating means for driving said circulating means.

8. Absorption refrigerating apparatus including a plurality of generating, absorbing, condensing and evaporating means, heating means including means for alternately heating the generating means, fan means for circulating a cooling medium in heat exchange relation with said condensing means, and a heat engine energized by said heating means for driving said fan.

9. Absorption refrigerating apparatus including a plurality of generating, absorbing, condensing, and evaporating means, heating means including means for alternately heating the generating means, fan means for circulating a cooling medium in heat exchange relation with said condensing means, said heating means including a pilot light, and a heat engine energized by said pilot light for driving said fan.

10. Absorption refrigerating apparatus including a plurality of generating, absorbing, condensing, and evaporating means, heating means including means for alternately heating the generating means, means for circulating a cooling medium in heat exchange relation with said condensing means, and a heat engine energized by said heating means for operating said circulating means.

11. Absorption refrigerating apparatus including a plurality of generating, absorbing, condensing, and evaporating means, heating means including means for alternately heating the generating means, means for circulating a cooling medium in heat exchange relation with said condensing means, and a Stirling type heat engine energized by said heating means for operating said circulating means.

12. An absorption refrigerating system comprising generating, absorbing, condensing and evaporating means, a fuel burner for heating the generating means, a fan for circulating a cooling medium into heat exchange relation with said condensing means, and a heat engine heated by heat derived from the combustion of fuel supplied by the burner for driving the fan.

13. An absorption refrigerating system comprising generating, absorbing, condensing and evaporating means, a fuel burner for heating the generating means, means for circulating a cooling medium into heat exchange relation with said condensing means, and a heat engine heated by the combustion of fuel supplied by said burner for operating said circulating means.

14. An absorption refrigerating system comprising a generator and an absorber, means for supplying heat to said generator, and mechanical means for circulating air over said absorber, said last named means being operated by heat derived from said heat supplying means.

15. An absorption refrigerating system comprising generating, absorbing, condensing and evaporating means, heating means including means for heating the generating means, means for circulating air into heat exchange relation with said absorbing means, and a heat engine energized by heat derived from said heating means for operating said circulating means.

16. An absorption refrigerating system comprising generating, absorbing, condensing and evaporating means, a fuel burner for heating the generating means, means for circulating a cooling medium into heat exchange relation with said absorbing means, and a heat engine heated by the combustion of fuel supplied by said burner for operating said circulating means.

HARRY F. SMITH.